United States Patent Office 2,932,669
Patented Apr. 12, 1960

2,932,669
CHLOROSUBSTITUTED BICYCLIC ALDEHYDE

Albert H. Haubein, Christiana, Del., assignor to Hercules Powder Company, Wilmington, Del., a corporation of Delaware No Drawing. Original application December 16, 1954, Serial No. 475,817, now Patent No. 2,806,813, dated September 17, 1957. Divided and this application July 3, 1957, Serial No. 669,715

1 Claim. (Cl. 260—598)

This invention relates to the Diels-Alder adduct of hexachlorocyclopentadiene and acrolein having the chemical formula 1,4,5,6,7,7 - hexachlorobicyclo(2.2.1)-5-heptene-2-carboxaldehyde.

The octachloro compound of the formula:

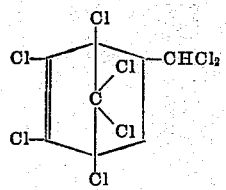

is an unexpectedly powerful insecticide and is described and claimed in copending application Serial No. 475,817, filed December 16, 1954, now U.S. Patent No. 2,806,-813. There is also described and claimed the method of its preparation by chlorination of the hexachlorocyclopentadiene-allyl chloride adduct. Chlorination of the hexachlorocyclopentadiene-allyl chloride adduct with chlorine gas leads to a mixture containing in addition to the above-depicted chemical compound also by-products of the chlorination of the Diels-Alder adduct of hexachlorocyclopentadiene and allyl chloride.

In accordance with the present invention, hexachlorocyclopentadiene and acrolein react to form a Diels-Alder adduct of the formula 1,4,5,6,7,7-hexachlorobicyclo-(2.2.1)-5-heptene-2-carboxaldehyde which can be chlorinated with phosphorus pentachloride to yield the same octachloro compound depicted above which is free of the by-products resulting from chlorination of the hexachlorocyclopentadiene-allyl chloride adduct. The hexachlorocyclopentadiene-acrolein adduct of this formula is thus a superior reagent for the preparation of insecticides.

The method of preparing the adduct of this invention and its use in the preparation of insecticides is set forth in more detail in the following example where all parts and percentages are by weight.

Example

A solution of 278 parts hexachlorocyclopentadiene and 56 parts acrolein in 45 parts xylene was heated under reflux while gradually raising the temperature from about 60° C. to about 140° C. as the acrolein underwent condensation with the hexachlorocyclopentadiene. This heating process took 48 hours. The solvent was then removed at 100° C. under reduced pressure and the residue was sublimed at 100–125° C. at 0.7 mm. pressure. The sublimed solid amounting to 125 parts was 1,4,5,6,7,7-hexachlorobicyclo(2.2.1) - 5 - heptenyl-2-carboxaldehyde which analyzed 63.2% chlorine and 9.3% carbonyl. This adduct was then heated with 200 parts phosphorus pentachloride at about 100° C. for 16 hours. The resulting product was taken up in ether, washed with water, with 10% aqueous sodium hydroxide and then with water. The ether layer was then dried over anhydrous sodium sulfate. After distilling off the ether, the product was distilled to recover 106 parts 2-dichloromethyl - 1,4,5,6,7,7 - hexachlorobicyclo(2.2.1)-5-heptene, B.P. 135–148° C./0.6 mm. which analyzed 73.6% chlorine. Infrared absorption data showed this product (designated product A) to be the same as that prepared by chlorination of the hexachlorocyclopentadiene-allyl chloride adduct described hereinafter and designated product B.

Product B was made from the hexachlorocyclopentadiene-allyl chloride adduct as follows.

A mixture of 125 parts hexachlorocyclopentadiene and 38 parts allyl chloride was heated in a sealed tube at 142–144° C. for 30 hours. The resulting product was distilled to recover 13 parts hexachlorocyclopentadiene and 135 parts 2-chloromethyl-1,4,5,6,7,7-hexachlorobicyclo(2.2.1)-5-heptene boiling at 96–106° C./0.15 mm. pressure, M.P. 52.4–54.2° C. when crystallized from alcohol. Analysis of this product showed 71.0% chlorine.

A solution of 175 parts 2-chloromethyl-1,4,5,6,7,7-hexachlorobicyclo(2.2.1)-5-heptene in 520 parts carbon tetrachloride was exposed to actinic light and heated to 75° C. while passing chlorine gas into the solution. After 36 parts chlorine had reacted, the reaction was stopped and the mixture was washed with aqueous sodium carbonate and water. The chlorinated 2-chloromethyl - 1,4,5,6,7,7 - hexachlorobicyclo(2.2.1)-5-heptene was recovered as 190 parts yellow viscous residue by distilling off the solvent up to 100° C. at 18 mm. pressure. This chlorinated product analyzed 73.7% chlorine, corresponding to 2 - dichloromethyl-1,4,5,6,7,7,-hexachlorobicyclo(2.2.1)-5-heptene. Infrared absorption spectra confirmed the structure as corresponding with the same product made from the hexachlorocyclopentadiene-acrolein adduct of this invention and also confirmed the presence of the double bond.

The comparative toxicity to insects and to mammals of products A and B is set forth in the table below.

| Toxicant | $LD_{50}$[1] Houseflies | $LD_{50}$[2] Albino Rats |
|---|---|---|
| Product A | 150 | 2,400 |
| Product B | 230 | 2,400 |

[1] Concentration in deodorized kerosene (mg. per 100 ml. solution) required for 50% kill in 20 hours.
[2] Weight of product in mg. per kilogram of body weight required for 50% kill in 2 weeks.

The $LD_{50}$ for houseflies was determined by dissolving the compound of the example in deodorized kerosene of different concentrations. A 0.8 ml. sample of each concentration was sprayed into a cage of 50 three-day-old flies. The sprayed flies were then anesthetized with carbon dioxide and transferred to clean cages where they were left for 20 hours. The number of dead flies was determined at the end of 20 hours and the concentration which killed 50% of the flies was recorded as $LD_{50}$ for houseflies in the tabulation.

The $LD_{50}$ for albino rats was determined by feeding weighed rats in groups of 5 measured amounts of a 5% solution (weight/volume) in corn oil by means of a stomach tube. Mortality records were noted at the end of two weeks after administration. The weight of compound in mg. per kg. of body weight required to kill 50% of the rats in this period of time was taken as $LD_{50}$ in the tabulation.

The octachloro compound obtained by reaction of the adduct of this invention with $PCl_5$ appears to have the optimum in toxicity to insects and with minimum mammalian toxicity for its particular chlorine content. Further chlorination to a total of 9 chlorine atoms decreases the toxicity to insects but not to mammals. Accordingly, these products find a wide utility in the insecticide field.

The chlorinated compound obtained from the adduct of this invention is used as the sole toxic agent in pesticidal formulations or in admixture with minor amounts of other toxicants for modification of the properties of the individual toxicants. This utility is more fully described in application Serial No. 475,817.

This application is a division of application Serial No. 475,817, filed December 16, 1954, now U.S. Patent No. 2,806,813.

What I claim and desire to protect by Letters Patent is:

As a chemical compound 1,4,5,6,7,7-hexachlorobicyclo(2.2.1)-5-heptene-2-carboxaldehyde.

No references cited.